Sept. 25, 1962 H. BENMUSSA ET AL 3,056,038

MAGNETIC CIRCUITS

Filed Jan. 3, 1957

2 Sheets-Sheet 1

*Inventors*

H. BENMUSSA-J.P. LE CORRE-
C. WEILL

By [signature]

Agent.

Sept. 25, 1962 H. BENMUSSA ET AL 3,056,038

MAGNETIC CIRCUITS

Filed Jan. 3, 1957 2 Sheets-Sheet 2

Inventors
H. BENMUSSA-J.P. LECORRE
-C. WEILL
By Paul W. Hemminger
Agent 3,056,038
Patented Sept. 25, 1962

3,056,038
MAGNETIC CIRCUITS

Henri Benmussa, Jean Pierre Le Corre, and Camille Weill, Paris, France, assignors to International Standard Electric Corporation, New York, N.Y., a corporation of Delaware Filed Jan. 3, 1957, Ser. No. 632,289
5 Claims. (Cl. 307—88)

The present invention relates to electric circuits incorporating magnetic materials having a substantially rectangular hysteresis loop characteristic and used in particular in switching and counting circuits.

There is known, in the art, magnetic materials having a substantially rectangular hysteresis loop characteristic. Such materials have already been used for counting circuits and in static devices for storing up information.

In known electronic circuits, there are often used delay arrangements utilizing the time constant of certain elements, such as condensers. However, such delay arrangements have the drawback that they do not provide a steep edge impulse at the end of their period of delay unless they are associated with active elements, such as electronic tubes.

One object of the present invention is to provide a delay circuit using only magnetic materials having a rectangular hysteresis loop and passive elements and which furnish at at the end of the delay period a steep edge impulse.

Another object of the present invention is to provide an impulse counting circuit using only passive elements and in particular magnetic materials having a rectangular hysteresis loop characteristic.

According to one feature of the invention, there is provided an electric circuit for introducing a predetermined delay comprising in combination a core of ferromagnetic material having a substantially rectangular loop characteristic, the said core being normally in a state of remanent magnetism in a given direction of magnetization, a winding on the said core, means for connecting said winding in series with a resistance to a constant voltage source and means supplying an output impulse in response to a variation of current in the circuit in series with the winding on said magnetic core.

According to another feature of the invention, there is provided a discriminating circuit comprising in combination, a core of ferromagnetic material having a substantially rectangular hysteresis loop characteristic, a first and a second winding on the core, a switching circuit for connecting a direct current source in series with the first or the second winding according to the presence or the absence of impulses at the input of the said switching circuit and means for detecting variations of current such as a transformer, connected in series with the first or the second winding or both, in accordance with the duration of the impulses, the length of the interval between impulses, or both.

Other objects, features and advantages of the present invention will appear from the following description of an embodiment, the said description being given in connection with the attached drawing, in which.

Figures 1, 2, 3, 4, 5, 6:
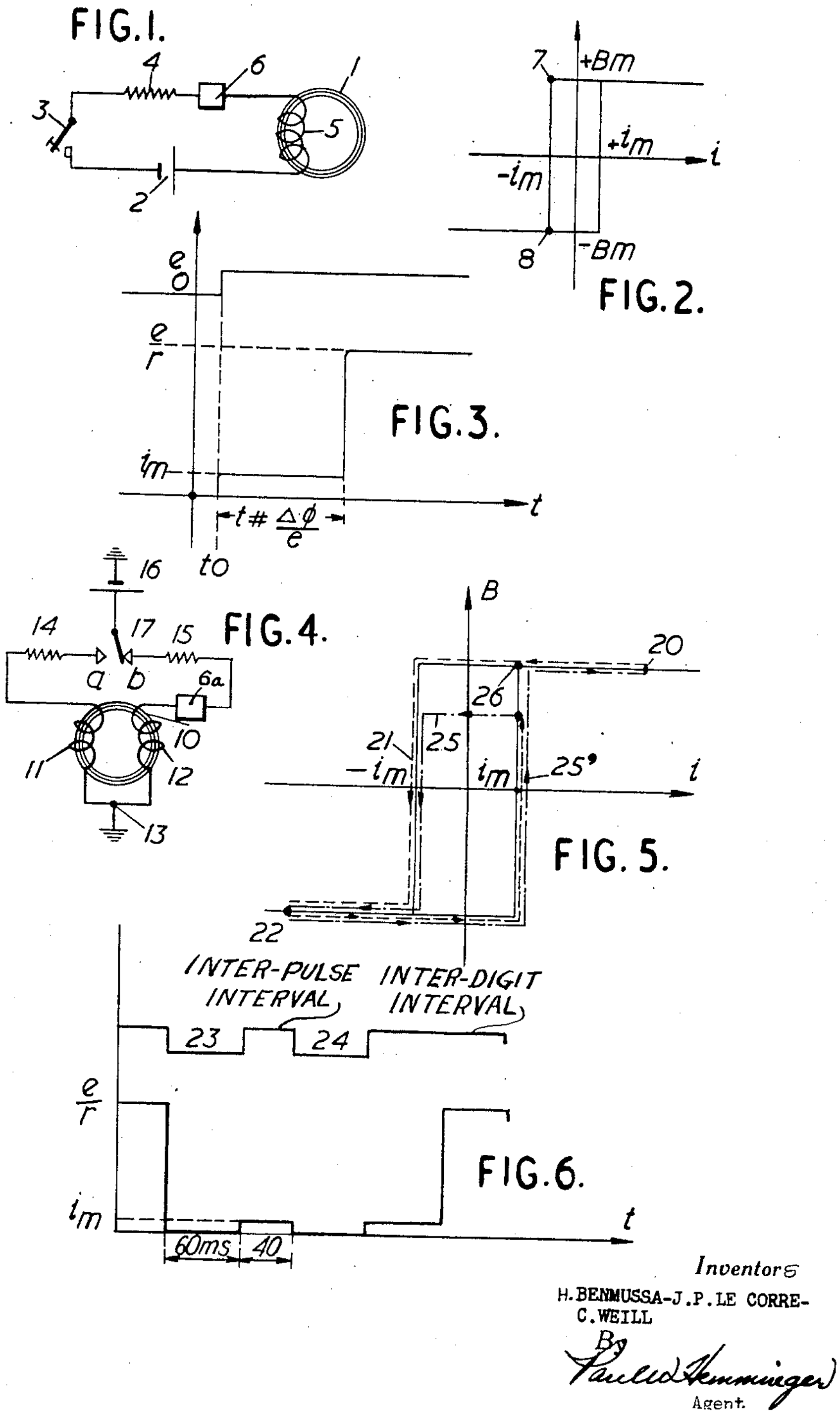
FIG. 1 represents schematically the basic circuit of the delay elements using features of the invention.
FIG. 2 represents a hysteresis loop of the ferromagnetic material used in the circuit of FIG. 1.
FIG. 3 is a curve used for explaining the operation of the circuit of FIG. 1.
FIG. 4 is a schematic diagram of a counting circuit using features of the invention.
FIGS. 5 and 6 are curves used for explaining the operation of FIG. 4.

Referring now to FIG. 1, there is shown a closed magnetic circuit constituted by a toroidal core 1 of ferromagnetic material having a winding 5 the circuit having a substantially rectangular hysteresis loop characteristic as shown in FIG. 2. Materials of that kind are well known in the art and are commercially available.

The electric circuit associated with the core 1 comprises a direct current source 2 which supplies for instance a difference of potential of "$e$" volts, a switch 3, a resistance 4 the value of which is "$r$" ohms, the winding 5 comprising N turns of wire, and a device 6 for measuring current. The elements 2–6 are serially connected as shown.

In the present description, the two directions of magnetic induction which the ferromagnetic core 1 can assume are respectively designated as positive magnetic induction (upper half of FIG. 2) and negative magnetic induction lower half (of FIG. 2). On the other hand, it will be assumed that the magnetic core is, in consequence of prior magnetization, placed in a state corresponding to a remanent magnetization $+Bm$ which, in the considered case, substantially corresponds to saturation. In FIG. 2 the current travelling in the winding 5 has been represented as the abscissae and the magnetic induction as the ordinates. If the winding 5 and the source 2 are connected in such a way as to supply a negative magnetic field when the switch 3 is closed, the point characterizing the state of the core 1 moves towards the left on the horizontal part of the hysteresis loop and the current reaches quickly the value $i_m$. During this period of the cycle, the inductance presented by the winding 5 is very small until the point 7 is reached. The value of the current becomes stable then to the value $i_m$ and the point characterizing the state of the core moves down the left vertical part of the hysteresis loop between the point 7 and the point 8. The time elapsed for going from the point 7 to the point 8 is given with a good approximation by the relation $e.t=10^{-8}\Delta\phi$, formula in which "$e$" is expressed in volts, "$t$" in seconds and $\Delta\phi=2.N.S.B_m$ in maxwells, where N is the number of turns in coil 5, S is the cross-section of core 1 in square centimeters and $B_m$ is the maximum induction in the core. The term, "$\Delta\phi$," is the magnetic flux variation through winding 5 as the condition of the core changes from point 7 to point 8 in the loop shown in FIG. 2. When the point characterizing the state of the core has reached the lower part of the vertical line of the hysteresis loop, it moves quickly towards the left on the horizontal part until it reaches the value $$I=\frac{e}{r}$$

The variations of the current in the winding 5 have been represented as functions of time in FIG. 3, the switch 3 having been closed at the instant $t_0$, as is shown in the upper part of FIG. 3.

If the current detecting element 6 is a transformer having a primary and secondary windings there may be derived at the terminals of the secondary winding an impulse when the current passes quickly from value $i_m$ to value $$\frac{e}{r}$$

Such a circuit element presents the advantage of introducing a delay at the end of a current impulse with a steep front edge. On the other hand, such a circuit uses only passive elements which last indefinitely since there are no moving parts which wear out. By changing the value of the voltage supplied by source 2 or by changing the number of turns of the winding 5, it is possible, to obtain a delay change varying within wide limits from a core having a fixed characteristic.

There has been shown in FIG. 4 a circuit which may be used for detecting intervals between trains of impulses in automatic telephone systems, and by way of example, reference will be made to telephone dialing operations wherein the digit pulses are of 60 milliseconds duration, the inter-pulse intervals are of 40 milliseconds duration and the inter-digit intervals are of a minimum duration of 100 milliseconds. The circuit of FIG. 4 comprises a toroidal magnetic core 10 having a rectangular hysteresis loop characteristic. There are two windings 11 and 12 wound about core 10 and connected at a common point 13. The two windings are connected in such a way as to produce reversed magnetic fields. In series with windings 11, 12 are connected resistances 14 and 15, respectively. A direct current source 16 may be applied selectively to windings 11, 12 by means of the single pole, double throw switch 17. For purpose of description of the response of the circuit of FIG. 4, switch 17 is shown as a manual switch which is alternately positioned on contact *b* for 60 ms. and on contact *a* for 40 ms. or for 100 ms. or more, with the change-over from one contact to another being instantaneous. The 60 ms. interval that switch 17 is positioned on contact *b* corresponds to the duration of a standard length dialling pulse, while the 40 ms. and 100 ms. intervals it is positioned on contact *a* corresponds to the time interval between successive pulses of any digit and the time interval between successive digits, respectively. The resistances 14 and 15, and the resistance 4 of the circuit of FIG. 1, function to limit the value of the current drawn from the source but they may be omitted if the elements 6 and 6a connected in series, therewith have an inherently high internal resistance.

Reference will now be made to FIG. 5 which shows the substantially rectangular hysteresis loop characteristic of the magnetic material used for constituting the core 10. It will be assumed that when the circuit in FIG. 4 is at rest, the switch 17 is on position *b*, the winding 12 being wound on the core 10 in such a direction that the core is then in a state corresponding to point 20 of FIG. 5. It will be also assumed that the different parameters indicated in relation with FIGS. 1 and 3 have been provided in such a way that the delay which has been introduced by the circuit associated with the winding 11 will be about 50 milliseconds, the delay introduced by the circuit associated with the winding 12 being about 60 milliseconds. Under these conditions, when the switch 17 is moved to its position *a*, and maintained in that position as indicated by interval 23 of FIG. 6, the point corresponding to the state of the core moves along the curve 21 represented in dotted line and reaches the point 22 at the end of the period of 60 milliseconds since core 12 has a 60 ms. delay circuit associated therewith as noted. When the switch 17 is moved to position *b* for the 40 millisecond inter-pulse period separating the first impulse of a train from the second, the point characterizing the state of the core moves from point 22 to the right vertical part of the hysteresis loop. The delay circuit elements associated with coil 11 have been chosen so that the point characterizing the state of the core at the end of the inter-pulse interval is at point 26; thus the current in the winding 12 does not exceed the value $i_m$. The lower curve of FIG. 6 shows the current variations in the winding 12 in response to the alternate operation of switch 17.

During the following impulse which lasts 60 milliseconds and which is indicated as 24 in FIG. 6, the characteristic point of the state of the core moves along the curve in FIG. 5 indicated with a dotted line at 25 and reaches again the point 22. At the end of this impulse, the winding 12 is again supplied with current and the point characterizing the state of the core moves along the right vertical part of the hysteresis loop. It has been assumed that the train of impulses comprises only two impulses, the duration of the closing of the contact *b* is at least equal to 100 milliseconds, so that the point characterizing the state of the core passes beyond the whole of the vertical part of the characteristic curve (during 60 milliseconds), then on to the horizontal part until it reaches the point 20 in following the mixed dotted line 25' as it has been stated above. The passage from the point 26 to the point 20 is practically instantaneous and the current passes briskly from the value $i_m$ to the value $$\frac{e}{r}$$

in which "$e$" is the potential of the source 16 and "$r$" the value of the resistance 15. The device 6a for detecting variations of current may be associated with an arrangement comprising a threshold device permitting the discrimination of an output impulse corresponding to a variation of current equalling $i_m$ with a variation of current corresponding to the value $$\frac{e}{r}-i_m$$

It is possible, in practice, with known magnetic materials, to obtain circuits in which the ratio of amplitude between $i_m$ and $$\frac{e}{r}$$

is of the order of ten.

Figure 7:
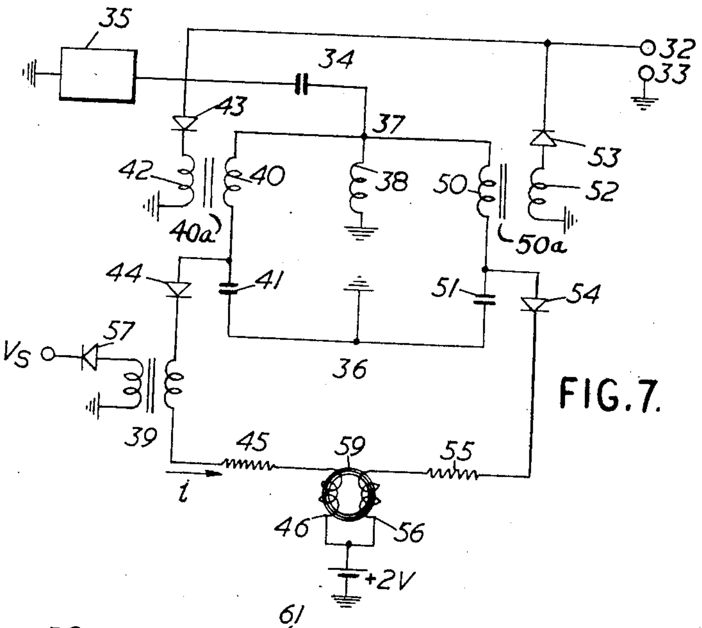
FIG. 7 is a schematic diagram of a detailed embodiment of the counting circuit shown in FIG. 4.
Figure 8:
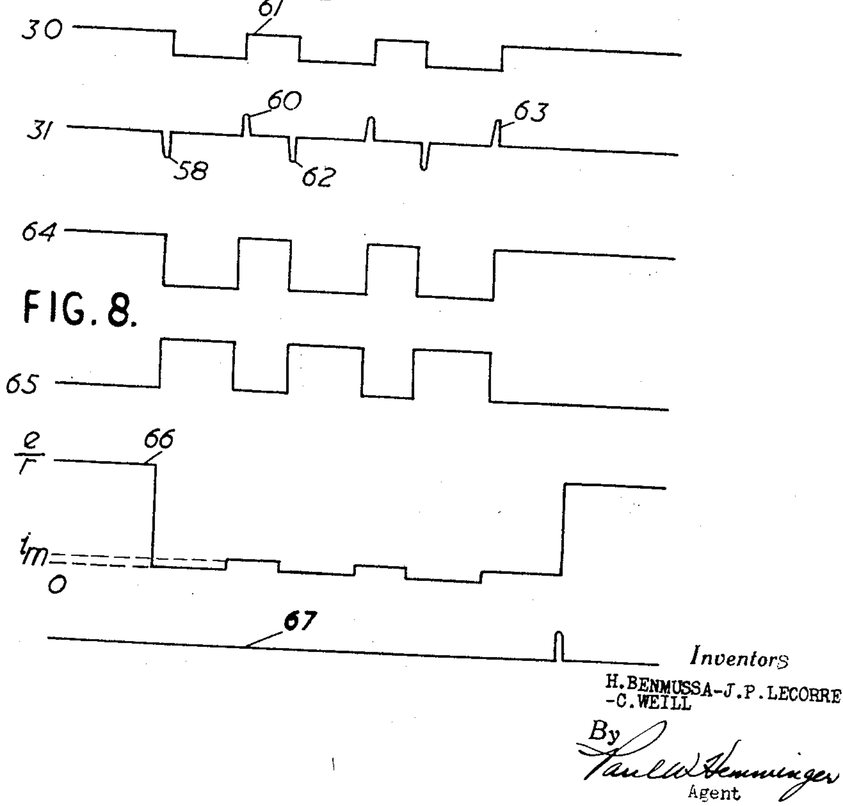
FIG. 8 represents wave shapes used for explaining the operation of FIG. 7.

There has been represented in FIG. 7 an embodiment of a circuit for detecting impulse trains and which can be used for instance in connection with a register circuit of an automatic telephone system. The use shown is non-limitative and it should be understood that the invention may be used in calculators or in any other device where the detection of impulses is of interest. Referring now to FIG. 7, the impulses of the calling dial which are obtained, as it is well known, by opening the line, are represented in curve 30 in FIG. 8, the impulses having a duration of about 60 milliseconds and the intervals between two impulses having a duration of about 40 milliseconds. These impulses are differentiated, for instance by means of a transformer and the differentiated impulses thus obtained, which are represented in curve 31 in FIG. 8, are applied to the input terminals 32 and 33. FIG. 7 is a ferroresonant flip-flop circuit. The flip-flop circuit comprises a pair of bi-stable circuits including windings 40, 50 wound on cores 40a, 50a, respectively, said cores being of ferromagnetic material. One end of each of the windings 40, 50 is connected in series with condensers 41, 51, respectively to ground. The LC combinations of 40, 41 and 50, 51 constitute series resonant circuits. The other end of windings 40, 50 are connected in parallel at 37, the assembly thus obtained being connected in series with a coupling condenser 34 and a source of alternating current 35 the frequency of which is about 15 kc. and the amplitude of which is of about 15 volts. The common point 37 is also connected to a choke coil 38 which offers a high impedance to the frequency of the output current.

The windings 40 and 50 are associated with control windings 42 and 52 respectively, the two windings 42 and 52 being coupled to the terminal 32 in series respectively with diodes 43 and 53 poled in opposite directions. The alternating voltage which appears at the terminals of the condensers 41, 51 is rectified by means of the additional diodes 44, 54 and is applied via resistances 45, 55, respectively to the two windings 46 and 56, respectively. The windings 46 and 56 and core 59 are arranged in a manner similar to that represented in FIG. 4, the two windings 46 and 56 being positioned on a ferromagnetic core 59 having a substantially rectangular hysteresis loop characteristic. The conditions prescribed for the windings and voltages applied thereto are similar to those which have been indicated in connection with FIG. 4 and in the example shown in FIG. 7, the windings 46 and 56 correspond to the windings 12 and 11, respectively in FIG. 4. The two connected ends of the windings 46 and 56 are connected to a potential source of +2 volts in the example shown. The output impulses are derived by means of an output transformer 39, the primary winding of which is connected in series with the rectifier 44 and the secondary winding of which is connected in series with the rectifier 57.

The operation of the circuit is as follows: It is assumed that when the circuit is quiescent, the series resonant circuit 40—41 is in a condition wherein the winding 40 presents a low impedance to the alternating currents from the source 35, that is to say that a substantial voltage appears at the terminals of the condenser 41. This voltage is rectified by the diode 44 and is applied to the winding 46 and a substantial current flows therethrough to ground. The state of the magnetic core 59 corresponds then to the point 20 in FIG. 5. When winding 52 is not energized, the normal inductance of winding 50 presents a high impedance to the alternating current supplied by source 35, so that the voltage appearing at the terminals of the condenser 51 is negligible and negligible current flows in the winding 56. This circuit condition corresponds to the condition of the circuit in FIG. 4 when the switch 17 is in the position 17–*b*. When there is applied to the terminal 32 the negative impulse 58 (curve 31, FIG. 8) which corresponds to the beginning of the first dialling impulse, this impulse is applied via the rectifier 53 to the winding 52 and it causes magnetization of the core 50*a* thereby decreasing the impedance of the winding 50 so that the inductive and capacitive reactances of 50, 51 are equal. The LC circuit 50, 51 resonates to the frequency of the waves received via the condenser 34 from source 35. When winding 50 is not energized the normal inductance of winding 40 presents a high impedance to the flow of current from source 35, so that the ferromagnetic core 59 and the winding 56 are in a condition corresponding to the position 17–*a* of the switch 17, FIG. 4.

During the application of the impulse 60 which corresponds to the end of the first dialing impulse, this positive impulse is applied by the diode 43 to the control winding 42 of the resonant circuit 40—41. The circuit 40, 41 is thus returned to its initial state during the duration of the interval 61 between the first and the second impulse and corresponding to the interval between positive pulse 60 and negative pulse 62 in curve 31 of FIG. 8. During this period and owing to the time constants of the circuits which are provided as it has been explained in connection with FIGS. 4 and 5, the point characterizing the state of the ferromagnetic core 59 moves over a fraction of the right vertical part of the hysteresis loop. The negative impulse 62 which corresponds to the beginning of the second dialling impulse is applied to the control winding 52 via the rectifier 53 so that the condition of the circuit again changes so that the winding 50 presents a low impedance to the waves from source 35. Owing to the time constant and to the duration of the impulse, the ferromagnetic core 59 changes its condition to the state corresponding to the point 22, FIG. 5. During the following impulses, the characteristic point of the condition of the core moves on a curve similar to the curve 25 (FIG. 5) so that the current in the primary winding of the transformer 39 does not exceed the value $i_m$. During the application of the positive impulse 63, which is the one corresponding to the end of the third impulse, which is the last impulse of the train, the circuit of FIG. 7 returns to the initial state in which the winding 40 again presents a low impedance to the waves from source 35. The characteristic point of the condition of the core 59 follows then a curve similar to the one of the curve 25' in FIG. 5 and as the interval of time separating two trains of impulses is at least equal to 100 milliseconds, the characteristic point of the condition of the ferromagnetic material can reach the point 20. The passage from the point 26 to the point 20 corresponds to a rapid variation of the current in the primary winding of the transformer 39 which passes from the value $i_m$ to the value $$\frac{e}{r}$$

"*e*" being the potential rectified by the diode 44 and "*r*" the total resistance of the circuit which comprises the winding 46. This rapid variation of the current in the primary winding of the transformer 39 appears as a positive impulse at the output terminal V*s* through rectifier 57.

In FIG. 8, the variations of the potential at the terminals of the diodes 44 and 54 have been respectively represented in curves 64 and 65. The variations of the current in the primary winding of the transformer 39 are represented in curve 66 and the output impulse appearing at the terminals V*s* is represented in curve 67. The diode 57 prevents the passage of a negative impulse to the output terminal V*s*, which negative impulse would correspond to the front edge of the first dialling impulse. The resistances 45 and 55 are used for limiting the current in the windings 46 and 56 respectively.

Such a counting or metering circuit for impulse trains, which can be controlled directly from impulses appearing on the line, comprises only passive elements and presents, consequently, affords more reliable operation over long periods of time in comparison with circuits which have the same functions but which use elements such as vacuum-tubes which are subject to wear, etc.

There has been given by way of example, particular embodiments of impulse train counting circuits. However, it is well understood that such circuits are capable of changes and modifications without departing from the scope of the invention.

While the principles of the invention have been described above in connection with specific embodiments and particular modifications thereof, it is to be clearly understood that this description is made only by way of example and not as a limitation on the scope of the invention.

What is claimed is:

1. A magnetic switching circuit comprising a ferromagnetic core having a substantially rectangular hysteresis loop characteristic and having a pair of oppositely disposed windings thereon, a pair of ferro-resonant switch means for respective ones of said ferro-magnetic core windings, a pair of uni-directional devices each interconnecting one of said ferro-magnetic core windings with its respective switch means, an input lead for receiving a succession of alternate positive and negative pulses of variable spacing, a second pair of oppositely poled uni-directional devices each interconnecting the said input lead with a different one of said switch means, an alternating current source and means for connecting it to both of said switch means, means responsive to the receipt of said pulses on said input lead for controlling the said switch means to selectively energize the said ferro-magnetic core windings from the said alternating current source, the said energization of said ferro-magnetic core windings being for a time interval corresponding to the spacing between said successive pulses, and output means associated with one of said ferro-magnetic core windings for generating an output pulse having a steep edge characteristic when the last-said winding is energized for a predetermined time interval.

2. A magnetic switching circuit as set forth in claim 1 wherein each said switch means includes a saturation winding and a controlled winding and wherein the said interconnection between the ferro-magnetic core windings and said switch means includes the said controlled windings.

3. A magnetic switching circuit as set forth in claim 2 wherein the said means for connecting the alternating current source to both of said switch means includes a condenser connected between the said controlled windings and said source.

4. A circuit arrangement as claimed in claim 2, wherein said output means comprises an output transformer having a primary winding and a secondary winding, said primary winding serially disposed between one of said controlled windings and its associated separate winding.

5. A circuit arrangement as claimed in claim 3, wherein said switch means further comprises a pair of condensers, each condenser serially connected to a different one of said controlled windings to form a series resonant circuit therewith, each of said resonant circuits adapted to respond to said alternating current source upon saturation of the core associated with such controlled winding.

References Cited in the file of this patent

UNITED STATES PATENTS

| | | |
|---|---|---|
| 2,709,757 | Triest | May 31, 1955 |
| 2,713,675 | Schmitt | July 19, 1955 |
| 2,775,713 | Isborn | Dec. 25, 1956 |
| 2,776,380 | Andrews | Jan. 1, 1957 |
| 2,795,776 | Epstein | June 11, 1957 |
| 2,834,893 | Spencer | May 13, 1958 |
| 2,881,268 | Spencer | Apr. 7, 1959 |